(12) United States Patent
Bai et al.

(10) Patent No.: US 9,774,402 B2
(45) Date of Patent: Sep. 26, 2017

(54) MULTI-CHANNEL OPTICAL COMMUNICATIONS INTEGRATED CIRCUIT CHIP HAVING AN IMPROVED LAYOUT FOR USE IN MULTI-CHANNEL OPTICAL TRANSMITTERS, RECEIVERS AND TRANSCEIVERS

(71) Applicant: Avago Technologies General IP (Singapore) Pte. Ltd., Singapore (SG)

(72) Inventors: Dezhao Bai, Sunnyvale, CA (US); Faouzi Chaahoub, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/056,577

(22) Filed: Feb. 29, 2016

(65) Prior Publication Data

US 2017/0250761 A1 Aug. 31, 2017

(51) Int. Cl.
*H04B 3/32* (2006.01)
*H04B 10/80* (2013.01)
*H04L 25/03* (2006.01)

(52) U.S. Cl.
CPC ............. *H04B 10/802* (2013.01); *H04B 3/32* (2013.01); *H04L 25/03821* (2013.01)

(58) Field of Classification Search
CPC .. G02B 6/4246; G02B 6/4214; G02B 6/4292; H04B 10/40; H04B 10/152; H04B 10/802; H04B 3/32; H04L 25/03821
See application file for complete search history.

(56) References Cited

U.S. PATENT DOCUMENTS

| | | |
|---|---|---|
| 2008/0036103 A1* | 2/2008 | Ban ...................... G02B 6/4206 264/1.25 |
| 2012/0328235 A1 | 12/2012 | Christensen et al. |
| 2013/0001410 A1 | 1/2013 | Zhao et al. |
| 2014/0341580 A1* | 11/2014 | Wang ..................... H04B 10/40 398/79 |
| 2014/0348512 A1* | 11/2014 | Chaahoub .............. H04B 10/40 398/139 |
| 2016/0013866 A1 | 1/2016 | Doerr |

* cited by examiner

*Primary Examiner* — Ted Wang

(57) ABSTRACT

Each channel of a high speed multi-channel transmitter or receiver IC chip layout is partitioned into at least first and second channel portions that are electrically interconnected with one another. Each first channel portion has an end that is located on an optical interface side of the multi-channel transmitter or receiver IC chip. Each second channel portion has an end that is located on an electrical interface side of the multi-channel transmitter or receiver IC chip. The pitch between the first channel portions is very fine and matches the pitch between optoelectronic elements of an optoelectronic array chip that interfaces with the optical interface side of the multi-channel transmitter or receiver IC chip. The pitch between the second channel portions is significantly greater than the pitch between the first channel portions to prevent cross talk.

20 Claims, 3 Drawing Sheets

MULTI-CHANNEL OPTICAL COMMUNICATIONS INTEGRATED CIRCUIT CHIP HAVING AN IMPROVED LAYOUT FOR USE IN MULTI-CHANNEL OPTICAL TRANSMITTERS, RECEIVERS AND TRANSCEIVERS

FIELD OF THE INVENTION

The invention relates to multi-channel optical transmitter, receiver and transceiver modules. More particularly, the invention relates to a multi-channel integrated circuit (IC) chip having an improved layout for use in multi-channel optical transmitter, receiver and transceiver modules.

BACKGROUND OF THE INVENTION

A variety of multi-channel optical communications modules exist for simultaneously transmitting and/or receiving multiple optical data signals over multiple respective optical data channels. A Multi-channel optical transmitter module, as that term is used herein, denotes an optical communications module having multiple optical transmit channels for simultaneously transmitting multiple optical data signals over respective optical waveguides (e.g., optical fibers). A Multi-channel optical receiver module, as that term is used herein, denotes an optical communications module having multiple optical receive channels for simultaneously receiving multiple respective optical data signals over respective optical waveguides. A Multi-channel optical transceiver module, as that term is used herein, denotes an optical communications module having multiple optical transmit channels and multiple optical receive channels for simultaneously transmitting and receiving multiple optical data signals over respective transmit and receive optical waveguides. A bidirectional (BiDi) multi-channel optical transceiver module, as that term is used herein, denotes an optical communications module having multiple BiDi channels for simultaneously transmitting and receiving optical data signals over each BiDi channel.

For each of these different types of parallel optical communications modules, a variety of designs and configurations exist. A typical electrical subassembly (ESA) layout for a multi-channel optical communications module includes a circuit board, such as a printed circuit board (PCB), and various electrical components and optoelectronic components (i.e., laser diodes and/or photodiodes) mounted on the circuit board. A typical ESA layout for a multi-channel optical transmitter module includes a PCB, a controller IC chip mounted on the PCB, a multi-channel transmitter IC chip (i.e., a laser diode array driver IC chip) mounted on the PCB and a laser diode array chip mounted on the PCB. In some cases, an array of laser diode chips, sometimes referred to as laser diode singlets, are used instead of a single chip have an array of laser diodes integrated in it. Various other passive electrical components such as capacitors, resistors and inductors are typically also mounted on the PCB.

The multi-channel transmitter IC chip interfaces on one of its sides with the controller IC chip and on the opposite side with the laser diode array chip. The side of the multi-channel transmitter IC chip that interfaces with the controller IC chip can be thought of as the electrical interface side of the multi-channel transmitter IC chip. The side of the multi-channel transmitter IC chip that interfaces with the laser diode array chip can be thought of as the optical interface side of the multi-channel transmitter IC chip.

A typical ESA layout for a multi-channel optical receiver module is similar to that of the multi-channel optical transmitter module except that the multi-channel transmitter IC chip is replaced by a multi-channel receiver IC chip. A typical ESA layout for a multi-channel optical transceiver module is also similar, but has both a multi-channel transmitter IC chip and a multi-channel receiver IC chip and both a laser diode array chip and a photodiode array chip. It is also known to integrate the functionality of the multi-channel transmitter IC chip and of the multi-channel receiver IC chip into a single IC chip.

Demands for higher-bandwidth multi-channel optical communications modules have led to efforts to design and manufacture multi-channel optical communications modules that have greater numbers of channels, i.e., higher channel density. Higher channel density requirements make it more challenging to meet the high-performance design specifications required by the systems in which they are employed. High-speed multi-channel transmitter and/or receiver IC chips are often required to be monolithically integrated on a single IC chip. In such cases, the density of the channels and of the signals they carry is very high due to space limitations of the IC package. In order to meet demands for both increased signal speed and channel density, the IC layout becomes even more critical.

Traditional multi-channel transmitter and receiver IC chip layouts replicate channels next to each other, i.e., side by side. To simply replicate channels side by side in the layout may not meet the performance and feasibility requirements of high signal speed and high channel density applications. The design challenges for achieving high speed signals and high channel density include, for example, meeting spatial constraints, limiting or preventing channel-to-channel crosstalk, providing electromagnetic interference (EMI) shielding, meeting power consumption constraints, meeting heat dissipation requirements, meeting reliability expectations, and achieving good signal integrity.

The high speed multi-channel transmitter and receiver IC chip layout is also required to meet certain mechanical specifications. The channel-to-channel pitch should be very small on the optical interface side to match the pitch of the optoelectronic devices of the laser diode or photodiode array chips. The channel-to-channel pitch should remain constant over the entire lengths of the channels to ensure good signal integrity. However, on the electrical interface side, the electrical contacts usually need to have a greater pitch than the channel-to-channel pitch in order to meet the greater trace-to-trace pitch of the PCB. To accommodate the greater pitch between the electrical contacts, the electrical signal pathways that connect the channels with the electrical contacts can be fanned out, but this tends to compromise signal integrity to some extent. This fan out solution is more difficult to use for greater numbers of channels due to constraints on the IC package size.

The advantage of the traditional layout is that each channel is almost identical, which makes integration of the layout easier to achieve. However, side-by-side layout of the channels leads to some disadvantages. For high speed signals, the electrical cross talk between adjacent channels has a strong relationship with the distance between the signals. Small channel-to-channel distances introduce high levels of cross talk that severely degrade the performance of the circuits. In addition, because the channel circuit elements are high speed circuit elements, they usually consume a large amount of power. The concentration of power consumption in the channels creates a large amount of heat, which can cause the circuit elements to have poor reliability unless expensive additional heat dissipation measures are taken. Moreover, if circuit elements of the channels are so large that the channel-to-channel pitch cannot match the pitch of the optoelectronic elements of the optoelectronic array chip, a traditional layout may not be achievable.

A need exists for a layout for high speed multi-channel transmitter and receiver IC chips that ensures that the channel-to-channel pitch on the optical interface side of the chip matches the pitch of the optoelectronic elements of the optoelectronic array chips in order to achieve high channel density and good performance. A need also exists for a layout that achieves this goal while also ensuring that mechanical, thermal and electrical constraints of the transmitter or receiver IC package and of the PCB are met. A further need exists for a layout that achieves these goals while also reducing electrical cross talk and improving signal integrity.

WRITTEN DESCRIPTION

Figure 1:
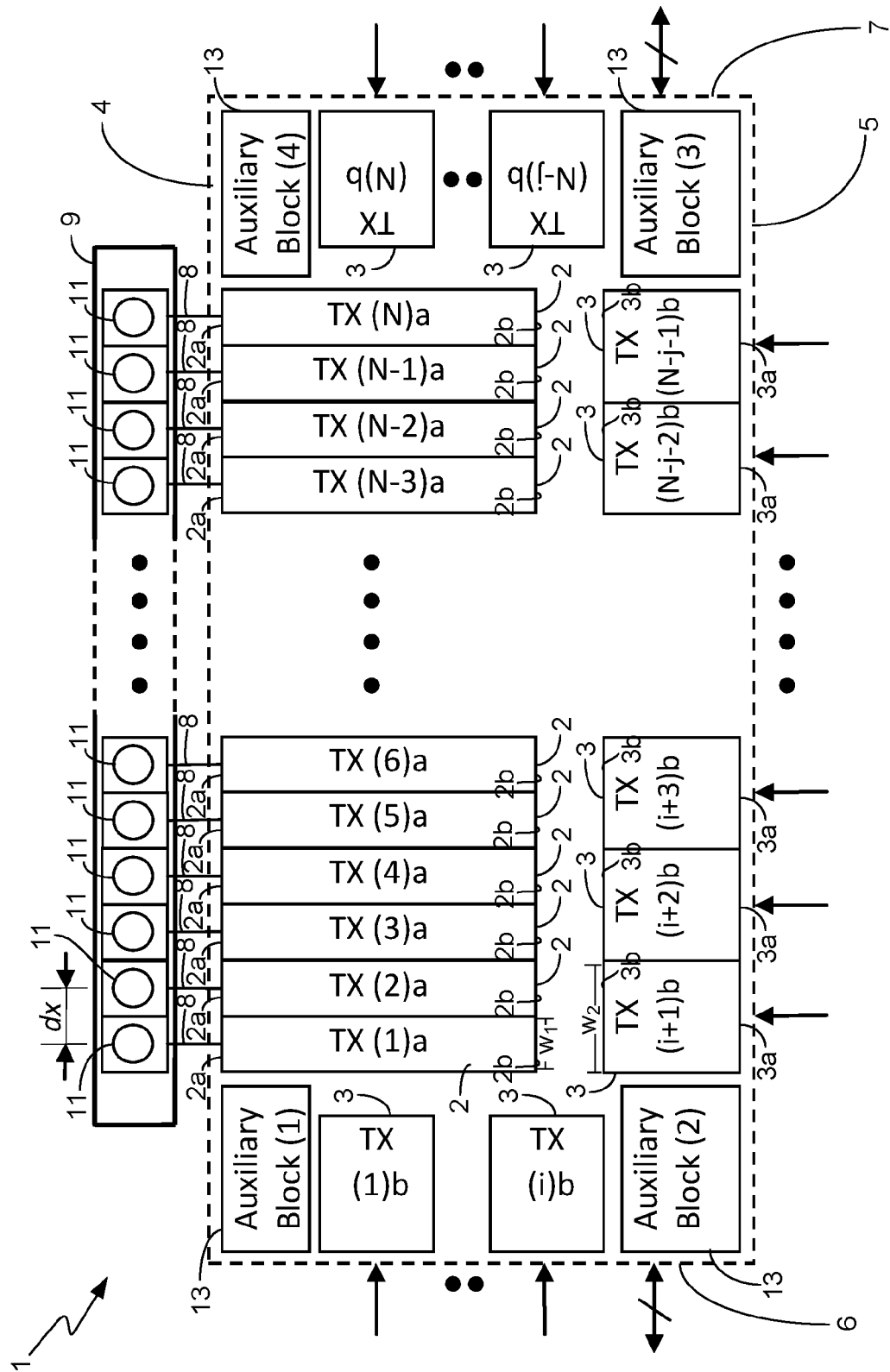
FIG. 1 illustrates a block diagram of a multi-channel transmitter IC chip having a layout in accordance with an illustrative embodiment in which each channel is partitioned into a first channel portion and a second channel portion.

In accordance with the illustrative, or representative, embodiments described herein, each channel of a high speed multi-channel transmitter or receiver IC chip layout is partitioned into at least first and second channel portions that are electrically interconnected with one another. Each first channel portion has an end that is located on an optical interface side of the multi-channel transmitter or receiver IC chip. Each second channel portion has an end that is located on an electrical interface side of the multi-channel transmitter or receiver IC chip. The pitch between the first channel portions is very fine and matches the pitch between optoelectronic elements of an optoelectronic array chip that interfaces with the optical interface side of the multi-channel transmitter or receiver IC chip. The pitch between the second channel portions is significantly greater than the pitch between the first channel portions to prevent cross talk and to meet mechanical requirements of the PCB.

The fine pitch between the first channel portions allows higher channel density and good signal integrity to be achieved. The greater pitch between the second channel portions has several advantages. One advantage is that it reduces electrical cross talk by spacing the high speed signals farther apart from one another at the electrical interface. Another advantage of the greater pitch is that it allows the multi-channel transmitter or receiver IC chip to be used with PCBs that have a greater electrical trace-to-trace pitch, i.e., a greater pitch between adjacent electrical traces. PCBs that have a very fine trace-to-trace pitch are more expensive than PCBs that have a greater trace-to-trace pitch due to the greater difficulty and higher costs associated with achieving a finer pitch on a PCB. Enabling the multi-channel transmitter or receiver IC chips to be used with the less expensive PCBs allows the overall module cost to be significantly reduced. Another advantage of the greater pitch of the second channel portions is that is spreads out the circuit element of the second channel portions over a greater area of the chip. Consequently, heat generated by the circuit elements of the second channel portions is spread out over a greater area of the PCB, which is important because the channel circuit elements are high speed circuit elements that generate a large amount of heat. Spreading out the heat in this manner leads to better heat dissipation and reduces complexity and cost of any heat dissipation solution that is used with the modules.

There are additional advantages to partitioning each channel into first and second channel portions. One advantage is that larger electrical elements can be located in the second channel portions to allow the channel-to-channel pitch in the first channel portions to be very fine to match the pitch between optoelectronic elements of the optoelectronic array chips. Another advantage is that circuit elements that generate a relatively large amount of heat and that are not constrained to being located in the first channel portions due to their functions can be located in the second channel portions. This facilitates the spreading of heat more uniformly over the area of the multi-channel transmitter or receiver IC chip.

These and other features and advantages will now be described with reference to a few illustrative embodiments, in which like reference numerals represent like components, elements or features. It should be noted that elements, components or features shown in the figures are not necessarily drawn to scale, emphasis instead being placed on demonstrating principles and concepts of the invention.

FIG. 1 illustrates a block diagram of a multi-channel transmitter IC chip 1 having a layout in accordance with an illustrative embodiment in which each channel is partitioned into a first channel portion 2 and a second channel portion 3. Each of the first channel portions 2 has a first end 2a located on an optical interface side 4 of the chip 1 and a second end 2b that is opposite the first end 2a. The chip 1 has N channels, where N is a positive integer that is greater than or equal to 2. The first channel portions 2 are labeled TX(1)a-TX(N)a.

In accordance with this illustrative embodiment, the second channel portions 3 are located along first, second and third electrical interface sides 5, 6 and 7, respectively, of the chip 1. In other embodiments, the second channel portions 3 are located on fewer than all of these sides 5, 6 and 7. For example, the second channel portions 3 may be located only on side 5. The second channel portions 3 are labeled TX(1)b-TX(N)b. The second and third electrical interface sides 6 and 7 are opposite one another and perpendicular to the optical interface side 4 and to the first electrical interface side 5, which are parallel to one another. Locating the second channel portions 3 along three electrical interface sides 5, 6 and 7 distributes the circuit elements of the second channel portions 3 over a larger area of the chip 1 to facilitate heat dissipation. It also provides more flexibility for routing the high speed signal paths of the channels. Each of the second channel portions 3 has a first end 3a located on one of the electrical interface sides 5-7 and a second end 3b opposite the first end 3a.

The chip 1 is shown connected on the optical interface side 4 by bond wires or PCB traces 8 to a laser diode array chip 9 having N laser diodes 11. The pitch, dx, between adjacent laser diodes 11 of the array chip 9 is equal to the pitch between adjacent first channel portions 2 of the chip 1. The pitch dx ranges from about 100 micrometers to about 500 micrometers, and typically is in the range of about 200 micrometers to 300 micrometers. In addition to the first and second channel portions 2 and 3, respectively, the chip 1 has auxiliary blocks 13 located in the four corners of the chip 1. The locations of the auxiliary blocks 13 because those spaces do not interfere with placement of the second channel portions 3. The invention is not limited with respect to the number of the auxiliary blocks 13 or the locations where they are located on the chip 1. The auxiliary blocks 13 provide low speed control signals between other circuitry (not shown) mounted on the PCB, e.g., a controller IC chip, and the circuitry of the chip 1, such as modulation and bias current adjustment signals to the laser diode drivers (not shown) of the chip 1.

In accordance with an illustrative embodiment, the second channel portions 3 have a first width, $w_1$, that is greater than a second width, $w_2$, of the first channel portions 2. The greater width $w_1$ of the second channel portions 3 allows them to accommodate electrical circuit elements (not shown) that are too wide to be located in the first channel portions 2. An example of such a circuit element is an on-chip inductor. Circuit elements that connect directly to the electrical interface are also located in the second channel portions 3, such as the electrical drivers (not shown) that drive the PCB traces (not shown) that connect to the electrical interfaces. This allows the first channel portions 2 to be kept very narrow, which allows the pitch between adjacent first channel portions 2 to match the pitch dx between adjacent laser diodes 11. Any circuit elements that generate large amounts of heat and that do not need to be located in the first channel portions 2 due to their functions are typically located in the second channel portions 3. This latter feature helps to distribute heat over a greater are of the chip 1, which helps with heat dissipation and allows a less expensive and less complex heat dissipation solution to be used in the system that incorporates the chip 1.

The circuit elements that are contained in the first channel portions 2 include, but are not limited to, the drivers (not shown) that drive the laser diodes 11 and any other circuit elements that directly connect via the bond wires or traces 8 to the laser diodes 11. In cases where the amount of heat generated by a circuit element, its size or its need to be directly connected to one interface side or the other do not dictate where the circuit element should be located, it will be located in whichever of the channel portions 2 and 3 makes the most sense based on functionality of the circuit element and/or its need to be located close to another circuit element.

The pitch between adjacent second channel portions 3 is equal to dx+y, where dx is the pitch between the first channel portions 2 and y is a number that is greater than or equal to zero. The pitch dx+y, in accordance with an embodiment, is selected based on: (1) the trace-to-trace pitch of the PCB at the locations on the PCB that will interface with the electrical interface sides 5-7 of the chip 1; and (2) the width $w_1$ of the second channel portions 3. The width $w_1$ of the second channel portions should be as large as possible in order to reduce or prevent electrical cross talk between the high speed signal paths of the second channel portions. However, from a practical view point, too large of a width $w_1$ will make the chip 1 undesirably large. Another advantage of having this wider pitch on the electrical interface sides 5-7 of the chip is that it allows the chip 1 to be used with less expensive PCBs that have greater trace-to-trace pitches.

Figure 2:
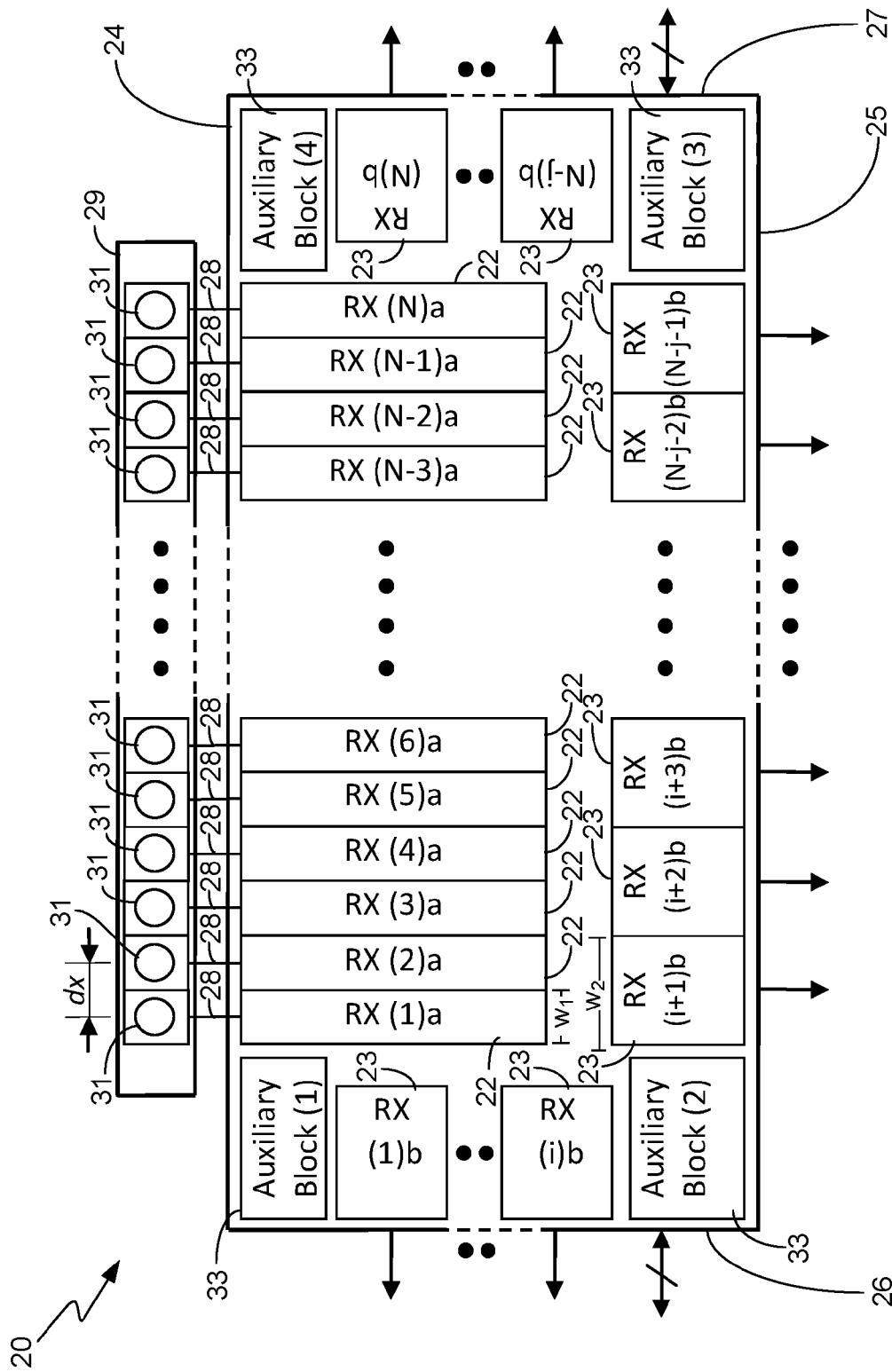
FIG. 2 illustrates a block diagram of a multi-channel receiver IC chip having a layout in accordance with an illustrative embodiment in which each channel is partitioned into a first channel portion and a second channel portion.

FIG. 2 illustrates a block diagram of a multi-channel receiver IC chip 20 having a layout in accordance with an illustrative embodiment in which each channel is partitioned into a first channel portion 22 and a second channel portion 23. The layout of the chip 20 shown in FIG. 2 is identical to the layout of the chip 1 shown in FIG. 1 except that the transmitter channels have been replaced by receiver channels and the laser diode array chip 9 has been replaced by photodiode array chip 29. The first channel portions 22 are labeled RX(1)a-RX(N)a and the second channel portions 23 are labeled RX(1)b-RX(N)b.

The second channel portions 23 are located along first, second and third electrical interface sides 25, 26 and 27, respectively, of the chip 20. In other embodiments, the second channel portions 23 are located on fewer than all of these sides 25, 26 and 27. As with the embodiment described above with reference to FIG. 1, locating the second channel portions 23 along three electrical interface sides 25, 26 and 27 distributes the circuit elements of the second channel portions 23 over a larger area of the chip 20 to facilitate heat dissipation and provides more flexibility for routing the high speed signal paths of the channels.

The pitch, dx, between adjacent photodiodes 31 of the array chip 29 is equal to the pitch between adjacent first channel portions 22 of the chip 20. The chip 20 has auxiliary blocks 33 located in the four corners of the chip 20. The pitch dx ranges from about 100 micrometers to about 500 micrometers, and typically is in the range of about 200 micrometers to 300 micrometers. The second channel portions 23 have a first width, $w_1$, that is greater than a second width, $w_2$, of the first channel portions 22 to allow the second channel portions 23 to accommodate electrical circuit elements (not shown) that are too wide to be located in the first channel portions 22. An example of such a circuit element is an on-chip inductor. Circuit elements that connect directly to the electrical interface are also located in the second channel portions 23, such as the electrical drivers (not shown) that drive the PCB traces (not shown) that connect to the electrical interfaces. Any circuit elements that generate large amounts of heat and that do not need to be located in the first channel portions 22 due to their functions are typically located in the second channel portions 23, which, as indicated above, helps with heat dissipation and allows a less expensive and less complex heat dissipation solution to be used in the system that incorporates the chip 20. Circuitry such as clock and data recovery (CDR) circuits, line equalizers and line drivers will typically be located in the second channel portions 23.

The circuit elements that are contained in the first channel portions 22 include, but are not limited to, the transimpedance amplifier (TIA) circuitry and any other circuit elements that directly connect via the bond wires or traces 28 to the photodiodes 31. In cases where the amount of heat generated by a circuit element, the size of the element or its need to be directly connected to one interface side or the other do not dictate where the circuit element should be located, it will be located in whichever of the channel portions 22 and 23 makes the most sense based on functionality and/or its need to be located close to another circuit element.

The pitch between adjacent second channel portions 23 is equal to dx+y, where dx is the pitch between the first channel portions 22 and y is a number that is greater than or equal to zero. The pitch dx+y is selected based on the same considerations discussed above with reference to FIG. 1.

The layout shown in FIG. 2 has all of the same advantages as the layout shown in FIG. 1, i.e., reduced cross talk at the electrical interface sides 25-27, a pitch in the first channel portions 22 that matches the pitch of the photodiodes 31, higher channel density, improved heat dissipation, the ability to use a less expensive PCB, the ability to use a less expensive and less complex heat dissipation solution, and improved flexibility in high speed signal path routing.

Figure 3:
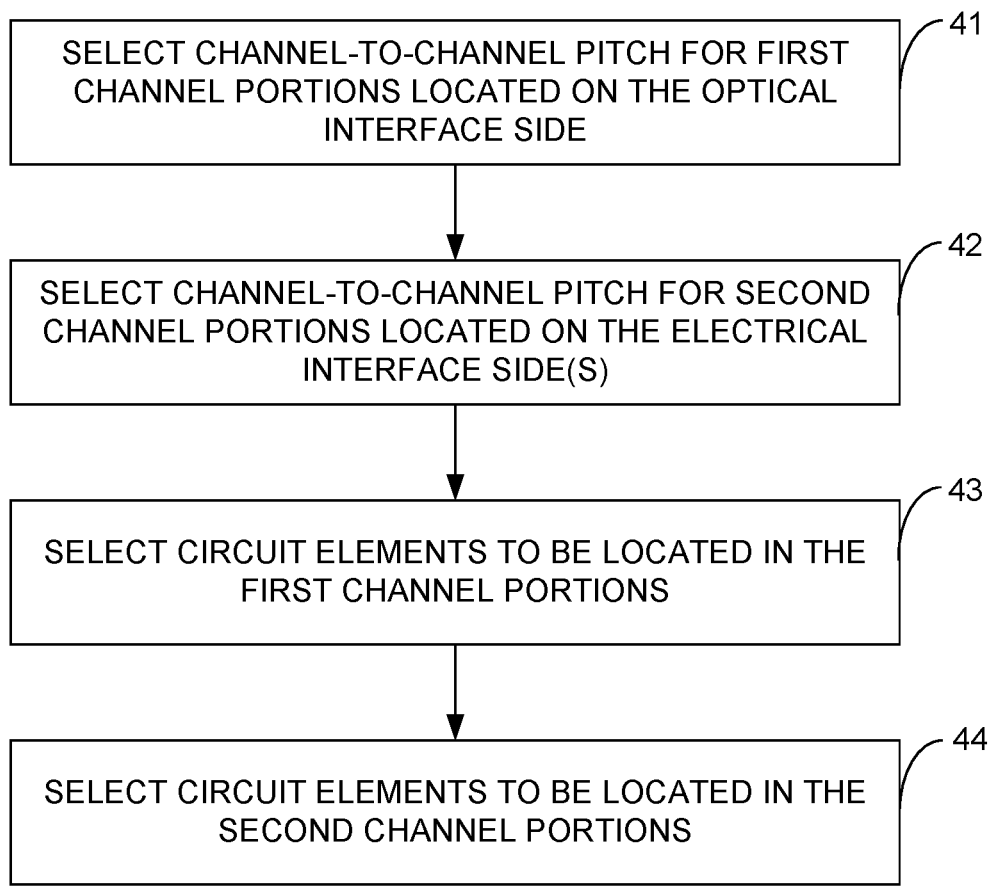
FIG. 3 illustrates a flow diagram of the method for designing the layout of the channels a high speed high multi-channel transmitter or receiver IC chip in accordance with an illustrative embodiment.

FIG. 3 illustrates a flow diagram of the method for designing the layout of the channels a high speed high multi-channel transmitter or receiver IC chip in accordance with an illustrative embodiment. The flow diagram depicts steps performed in a particular order, but the steps can be rearranged and performed in a different order, as will be understood by persons of skill in the art in view of the description provided herein. One of the steps is to select the channel-to-channel pitch for the first channel portions, indicated by block 41. As indicated above, this will typically be selected to match the pitch between adjacent laser diodes or photodiodes of the laser diode or photodiode array chip, respectively.

The channel-to-channel pitch for the second channel portions is selected, as indicated by block 42. As indicated above, this may be dictated to a large extent by the trace-to-trace pitch of the PCB with which the chip will be used, but it may be selected based in part or entirely on other considerations, such as the desired width $w_1$ of the second channel portions. As indicated above, the width $w_1$ of the second channel portions should be as large as possible in order to reduce or prevent electrical cross talk between the high speed signal paths of the second channel portions, but cannot be so large that it would result in the chip being impermissibly large in size.

The circuit elements that are to be located in the first channel portions are selected, as indicated by block 43. As indicated above, this decision takes several factors into account, including, for example, the size of the circuit element, whether the functionality of the circuit element dictates that it be located in one of the first and second channel portions, whether the circuit element connects directly to the electrical or optical interface, the amount of heat that is produced by the circuit element, and/or the amount of power that is consumed by the circuit element. Other factors may be taken into account, as will understood by those of skill in the art in view of the discussion provided herein.

The circuit elements that are to be located in the second channel portions are selected, as indicated by block 44. As indicated above, this decision also takes several factors into account, including, for example, the size of the circuit element, whether the functionality of the circuit element dictates that it be located in one of the first and second channel portions, whether the circuit element connects directly to the electrical or optical interface, the amount of heat that is produced by the circuit element, and/or the amount of power that is consumed by the circuit element. Other factors may be taken into account, as will understood by those of skill in the art in view of the discussion provided herein.

It should be noted that steps 41 and 42 could be swapped in order and steps 43 and 44 could be swapped in order. Also, additional steps that are not described herein may be added to the design process, as will be understood by those of skill in the art in view of the description provided herein.

It should be noted that the illustrative embodiments of the multi-channel transmitter and receiver IC chip layouts described herein are intended to demonstrate principles and concepts of the invention, but are not intended to represent the only possible layouts, as will be understood by those of skill in the art in view of the description provided herein. For example, the chips 1 and 20 could be integrated into a single multi-channel transceiver chip or BiDi chip. Other variations and modifications may be made to the embodiments described herein, as will be understood by those skilled in the art, and all such modifications and variations are within the scope of the invention.

What is claimed is:

1. A multi-channel optical communications integrated circuit (IC) chip comprising:
   an optical interface side for interfacing the chip with an optoelectronic array chip comprising an array of optoelectronic elements positioned side by side such that centers of adjacent optoelectronic elements are separated from one another by a first pitch;
   at least a first electrical interface side that is opposite and parallel to the optical interface side; and
   N electrical channels, where N is a positive integer that is greater than or equal to two, each electrical channel being partitioned into at least first and second channel portions that are electrically interconnected with one another, each first channel portion having a first end located on the optical interface side and a second end that is opposite the first end, a plurality of the second channel portion having firsts ends that are located on the first electrical interface side and second ends that are opposite the respective first ends of the second channel portions, the first channel portions extending in a direction away from the optical interface side and perpendicular to the optical interface side, wherein adjacent first channel portions are separated from one another by the first pitch, said plurality of the second channel portions extending in a direction away from the first electrical interface side perpendicular to the first electrical interface side, wherein adjacent second channel portions of said plurality of the second channel portions are separated from one another by a second pitch that is greater than the first pitch.

2. The multi-channel optical communications IC chip of claim 1, wherein the first channel portions have a first width and the second channel portions have a second width that is greater than the first width.

3. The multi-channel optical communications IC chip of claim 2, wherein each second channel portion includes at least a first circuit element that is too large to be located in the first channel portion due to the first circuit element having a width that is greater than the first width and less than the second width.

4. The multi-channel optical communications IC chip of claim 3, wherein the first circuit element is an inductor.

5. The multi-channel optical communications IC chip of claim 1, wherein the multi-channel optical communications IC chip is a multi-channel optical transmitter IC chip and wherein each first channel portion includes a driver circuit element for driving a respective one of the optoelectronic elements of the optoelectronic array chip.

6. The multi-channel optical communications IC chip of claim 1, wherein the multi-channel optical communications IC chip is a multi-channel optical receiver IC chip and wherein each first channel portion includes a receiver circuit element for receiving an electrical signal output from a respective one of the optoelectronic elements of the optoelectronic array chip.

7. The multi-channel optical communications IC chip of claim 1, wherein the multi-channel optical communications IC chip is a multi-channel optical receiver IC chip and wherein each first channel portion includes a transimpedance amplifier (TIA) circuit.

8. The multi-channel optical communications IC chip of claim 1, wherein the multi-channel optical communications IC chip is a multi-channel optical receiver IC chip and wherein each second channel portion includes a clock and data recovery (CDR) circuit.

9. The multi-channel optical communications IC chip of claim 1, wherein each second channel portion includes a driver circuit element.

10. The multi-channel optical communications IC chip of claim 1, wherein each second channel portion includes an equalizer circuit element.

11. The multi-channel optical communications IC chip of claim 1, wherein each second channel portion includes a line driver circuit element.

12. The multi-channel optical communications IC chip of claim 1, wherein the partitioning of the electrical channels into the first and second channel portions helps spread out heat generated by circuit elements of the channels over a wide area of the multi-channel optical communications IC chip of claim 1 to help dissipate the heat.

13. The multi-channel optical communications IC chip of claim 1, wherein the first pitch is in a range of between about 100 micrometers and about 500 micrometers.

14. The multi-channel optical communications IC chip of claim 1, wherein the first pitch is in a range of between about 200 micrometers and about 300 micrometers.

15. The multi-channel optical communications IC chip of claim 1, wherein spacing adjacent first channel portions from one another by the first pitch helps achieve high signal integrity.

16. The multi-channel optical communications IC chip of claim 1, wherein the greater second pitch between adjacent second channel portions of said plurality of the second channel portions helps reduce electrical cross talk between adjacent second channel portions.

17. The multi-channel optical communications IC chip of claim 1, further comprising second and third electrical interface sides that are opposite and parallel to one another and perpendicular to the first electrical interface side, and wherein each of the second and third electrical interface sides has at least one of the second channel portions located thereon.

18. The multi-channel optical communications IC chip of claim 17, further comprising at least one auxiliary block located in a corner where the optical interface side meets the second electrical interface side.

19. A multi-channel optical transmitter integrated circuit (IC) chip having a layout that helps prevent or reduce electrical cross talk and maintain high signal integrity, the IC chip comprising:
an optical interface side for interfacing the chip with an optoelectronic array chip comprising an array of optoelectronic elements positioned side by side such that centers of adjacent optoelectronic elements are separated from one another by a first pitch;
a first electrical interface side, the first electrical interface side being opposite and parallel to the optical interface side; and
N electrical channels, where N is a positive integer that is greater than or equal to four, each electrical channel being partitioned into at least first and second channel portions that are electrically interconnected with one another, each first channel portion having a first end located on the optical interface side and a second end that is opposite the first end, the second channel portions having firsts ends that are located on the electrical interface sides and second ends that are opposite the respective first ends of the second channel portions, the first channel portions extending in a direction away from the optical interface side and perpendicular to the optical interface side, wherein adjacent first channel portions are separated from one another by the first pitch, wherein adjacent second channel portions are separated from one another by a second pitch that is greater than the first pitch and that is sufficiently great to prevent electrical cross talk between high speed signal paths of adjacent second channel portions.

20. A multi-channel optical communications integrated circuit (IC) chip having a layout that helps dissipate heat, the IC chip comprising:
an optical interface side for interfacing the chip with an optoelectronic array chip comprising an array of optoelectronic elements positioned side by side such that centers of adjacent optoelectronic elements are separated from one another by a first pitch;
first, second and third electrical interface sides, the first electrical interface side being opposite and parallel to the optical interface side, the second and third electrical interface sides being opposite and parallel to one another and perpendicular to the first electrical interface side;
at least one auxiliary block located in corner of the multi-channel optical communications IC chip; and
N electrical channels, where N is a positive integer that is greater than or equal to four, each electrical channel being partitioned into at least first and second channel portions that are electrically interconnected with one another, each first channel portion having a first end located on the optical interface side and a second end that is opposite the first end, the second channel portions having firsts ends that are located on one of the first, second and third electrical interface sides and second ends that are opposite the respective first ends of the second channel portions, the first channel portions extending in a direction away from the optical interface side and perpendicular to the optical interface side, wherein adjacent first channel portions are separated from one another by the first pitch, wherein adjacent second channel portions are separated from one another by a second pitch that is greater than the first pitch, wherein locating the second channel portions such that first ends of the second channel portions are located on one of the first, second and third electrical interface sides helps with heat dissipation by spreading out circuit elements of the electrical channels over a wide area of the multi-channel optical communications IC chip.

* * * * *